United States Patent [19]

Kovacs

[11] Patent Number: 5,213,198
[45] Date of Patent: May 25, 1993

[54] RECIRCULATING TRANSFER MECHANISM

[75] Inventor: Lloyd Kovacs, Sheboygan, Wis.

[73] Assignee: Hayssen Manufacturing Company, Sheboygan, Wis.

[21] Appl. No.: 870,936

[22] Filed: Apr. 20, 1992

[51] Int. Cl.$^5$ .............................................. B65G 19/00
[52] U.S. Cl. ...................................... 198/728; 198/732
[58] Field of Search ............. 198/728, 729, 732, 468.1

[56] References Cited

U.S. PATENT DOCUMENTS

| | | | |
|---|---|---|---|
| 2,135,773 | 11/1938 | Sheppard | 198/732 X |
| 4,073,374 | 2/1978 | Hinchcliff et al. | 198/468.1 X |
| 4,076,115 | 2/1978 | Daisley et al. | 198/468.1 |
| 4,420,074 | 12/1983 | Thomas | 198/728 |

Primary Examiner—D. Glenn Dayoan
Attorney, Agent, or Firm—Lee, Mann, Smith, McWilliams, Sweeney & Ohlson

[57] ABSTRACT

A recirculating apparatus for transfer of objects from a first position to a second position. A pair of spaced, endless conveying chains have at least one flight located between them, the flight being connected to and travelling with the chains. A third chain is located at one side of the first and second chains, offset relative to the first two chains. The flight is linked to the third chain such that when the three chains are driven in unison, the flight does not rotate about its axis.

21 Claims, 4 Drawing Sheets

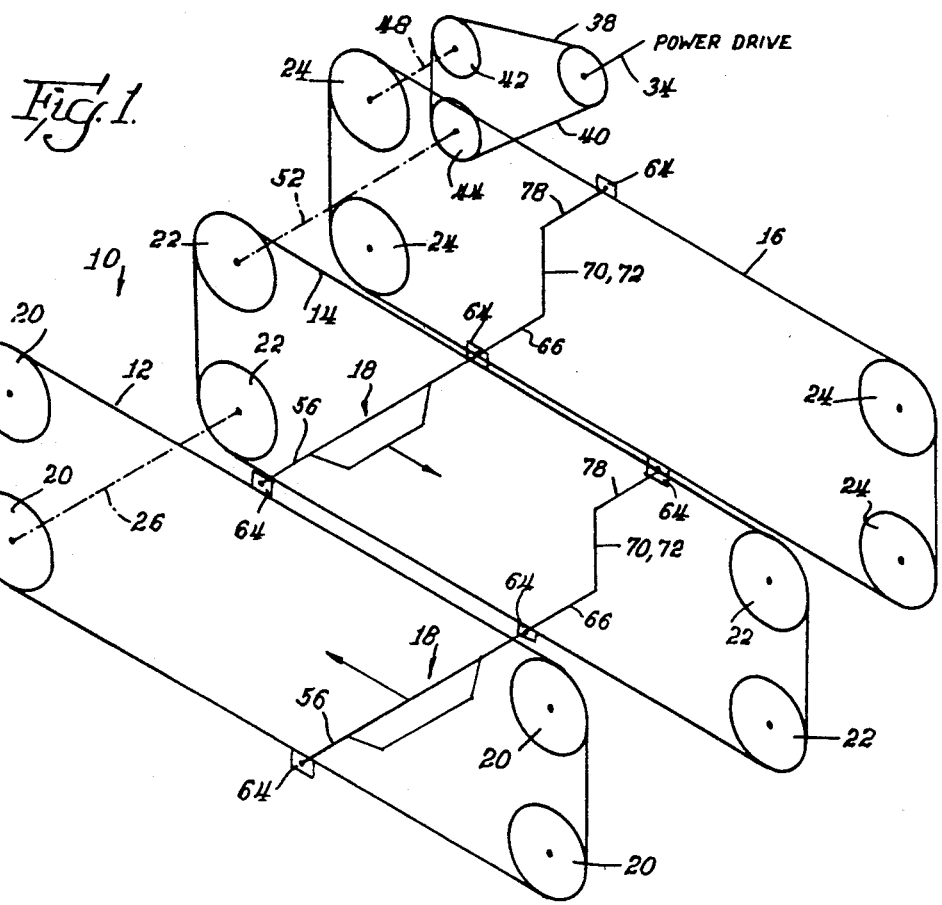
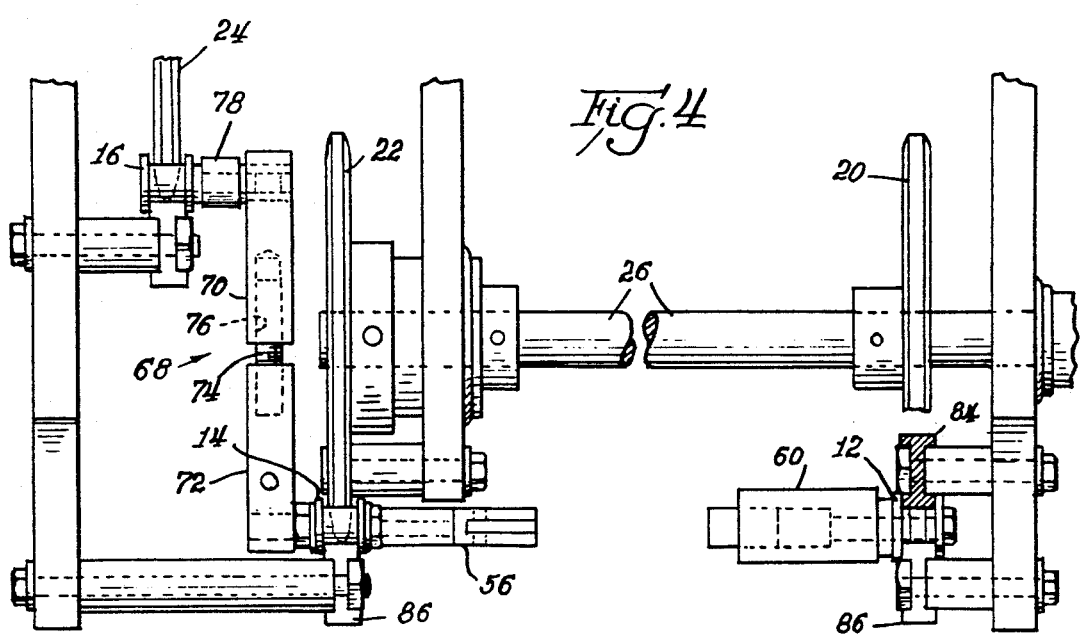

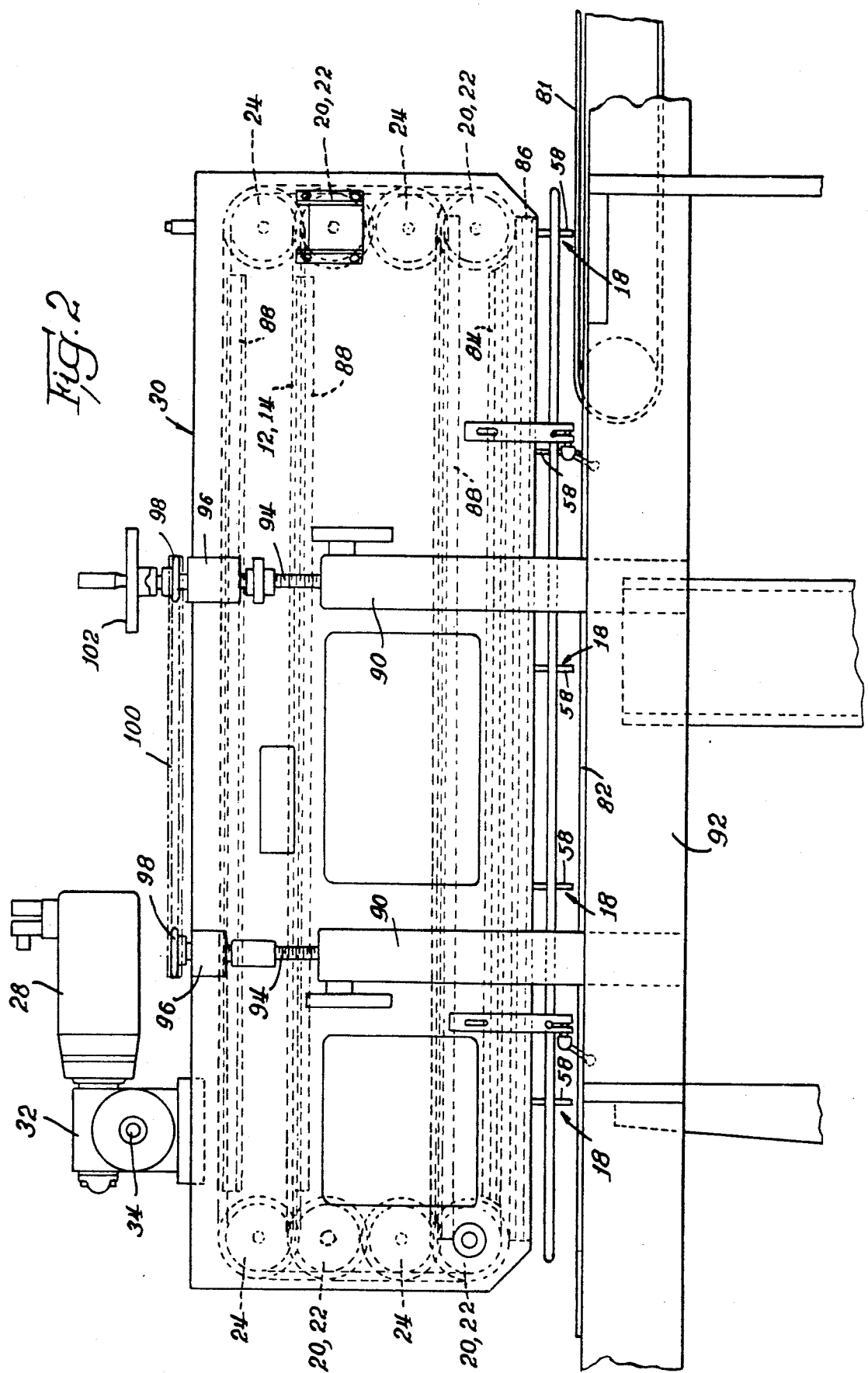

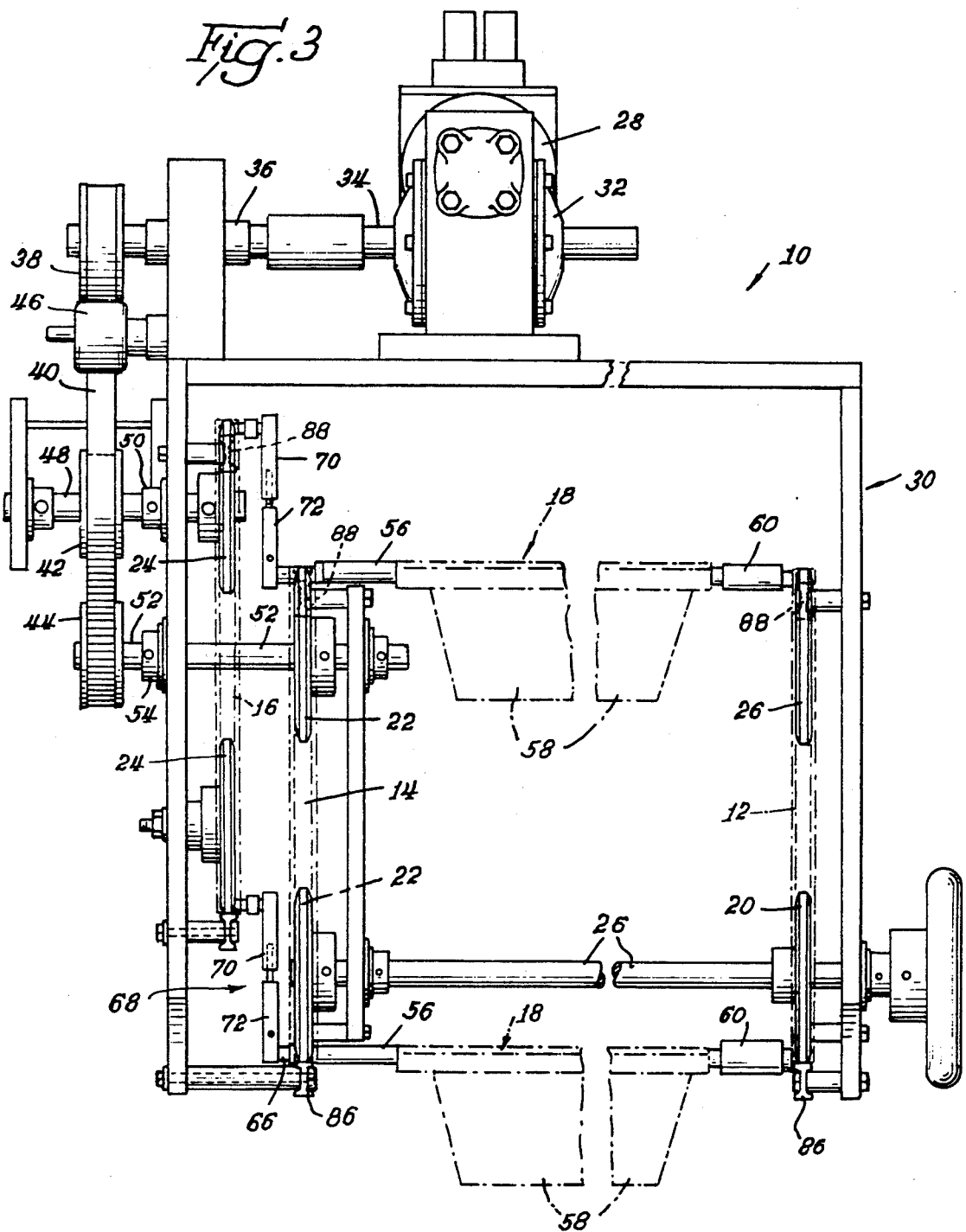

RECIRCULATING TRANSFER MECHANISM

BACKGROUND OF THE INVENTION

This invention relates to conveying devices, and in particular to a recirculating apparatus for transfer of objects from a first position to a second position, with the transferring means being rotationally stationary and not rotating about its own axis as the apparatus recirculates.

Recirculating apparatus for conveying objects from one location to another is well known. For example, a simple conveyor belt, which is endlessly recirculating, can transfer objects from an inlet location to an outlet location. More sophisticated conveying devices, such as belts having segmented flights or dividers, accomplish the same purpose. However, because the conveyor rotates about opposite sprockets or wheels on opposite ends of the conveyor, any upstanding flights or dividers, particularly those extending some distance from the surface of the conveyor belt, accelerate as motion changes from linear to circular as the flights or dividers are returned in their endless paths. When a conveyor is used to push or lift an object, such acceleration can be particularly undesirable if constant velocity of the object is desired. The assignee of the present application, Hayssen Manufacturing Company of Sheboygan, Wis., U.S.A., manufactures packaging equipment in which conveyor flights are used to transfer packages or portions of packages from one location to another. For precise timing and proper handling of the packages, it is imperative that conveyors not accelerate the packages unless acceleration is an intended result. Thus, when packages are pushed or lifted by flights of conveyors, it is important that as the packages are either disengaged or engaged by the flights, the flights maintain a constant velocity at all locations of engagement with a conveyed package. Not only does maintaining a constant velocity properly sequence packages that are conveyed as they pass from one section of an apparatus to another, but also the constant velocity avoids damage to packages as flights are initially brought into contact with packages, or disengage from packages during the return sequence of the flights.

Recognizing that pushing or lifting flights must engage and disengage their transported packages normally at constant velocities, Hayssen Manufacturing Company developed, in the past, a conveying apparatus comprising spaced conveying chains, one of which is offset vertically from the other. Conveying flights are connected horizontally between the chains, with a vertical arm connecting each of the flights to one of the chains. Because the chains are offset from one another, even though the flights travel through a recirculating endless motion, the flights do not rotate about their axes. Therefore, the flights engage and disengage packages at a constant velocity.

A significant problem with such an apparatus, however, has been the fact that the two offset chains must be separated from one another a significant distance in order to accommodate the products being conveyed. The distances between the chains can often be on the order of a foot ($\frac{1}{3}$ meter) or more. Because the chains are offset from one another, and due to the distances involved, a considerable amount of wracking can occur for a flight, particularly when relatively heavy objects are to be transported. Wracking results in undesired flexibility of the flights, resulting in acceleration or deceleration of conveyed product that was intended to be avoided.

SUMMARY OF THE INVENTION

The present invention relates to a recirculating apparatus for transfer of objects from a first position to a second position which avoids any wracking of conveyor flights. The apparatus comprises a pair of spaced, substantially identical endless first and second conveying devices, and means for driving the first and second conveying devices in unison. At least one conveying flight is located between the first and second conveying devices, the flight being connected to and travelling with the conveying devices as they traverse their paths. A third endless conveying device is located at one side of the first and second conveying devices, the third conveying device being substantially identical to the first two conveying devices, and being offset relative to the one conveying device next to which the third conveying device is located. Means is provided for also driving the third conveying device in unison with the first and second conveying devices. An alignment coupling interconnects the third conveying device and the flight. The coupling has a leg extending between the third conveying device and the flight, with the leg being rigidly connected to the flight to prevent rotation of the flight relative to the leg, and to consequently prevent rotation of the flight about its axis.

In accordance with the preferred form of the invention, each of the conveying devices comprises an endless chain having a series of pivotally connected links. Each flight comprises a crossbeam extending between the first and second conveying devices, with the crossbeam being pivotally connected to the chains of each of the first and second conveying devices at a pivotal link connection. That pivotal link connection comprises a link pin connecting adjacent links of each chain.

The chains of each of the conveying devices pass over sprocket wheels. A shaft drivingly connects a sprocket wheel of the first conveying device to a sprocket wheel of the second conveying device so that the chains may be driven in unison. A motor associated with the shaft is provided for rotating the shaft and driving the chains. The shaft is also drivingly coupled to a sprocket wheel of the chain of the third conveying device so that all three conveying devices are driven strictly in unison.

The leg connected to the flight is also connected to a pivotal arm which connects the leg to the chain of the third conveying device. The arm is connected to a pivotal link connection of one of the links of the chain of the third conveying device in the same fashion that the crossbeam is connected to the chains of the first and second conveying devices.

In order to accommodate some change in spacing between the chains of the third conveying device and the first and second conveying devices, preferably each leg comprises a pair of leg sections, with the leg sections being slidingly interconnected. That sliding interconnection comprises a shaft extending from one of the leg sections and engaging a socket formed in the other of the leg sections.

The endless chains are guiding through at least portions of their travel to rigidify a flight as it conveys an object. For such guiding, at least one pair of elongated, spaced rails are located on opposite sides of each of the first and second chains to sandwich the chains between the rails.

In accordance with the preferred form of the invention, each of the endless chains traverses a generally rectangular path, and therefore each of the conveyors is generally rectangular in configuration. In accordance with another form of the invention, the chains are oriented with sides being disposed at an angle to the vertical such that each flight includes at least one inclined path which is traversed by the flight during its recirculating motion. In this form of the invention, each flight includes a horizontally-disposed means for carrying objects. Thus, in this form of the invention, the flights can be used to elevate objects from a lower location to a higher location, or, conversely, lower objects from an elevated location to a lower location.

BRIEF DESCRIPTION OF THE DRAWINGS

The invention is described in greater detail in the following description of examples embodying the best mode of the invention, taken in conjunction with the drawing figures, in which:

FIG. 1 is an exploded schematic perspective of the basic elements of the invention, showing how the flights are interconnected with their conveying devices and driven in unison, FIG. 2 is a side elevational view of one form of the recirculating transfer mechanism according to the invention, FIG. 3 is an enlarged end view, taken from the left end of FIG. 2, showing the recirculating transfer mechanism according to the invention, with the apparatus broken away and somewhat truncated in width, FIG. 4 is a further enlarged detail of the lower portion of FIG. 3, again broken away and truncated in width.

DESCRIPTION OF EXAMPLES EMBODYING THE BEST MODE OF THE INVENTION

Figure 5:
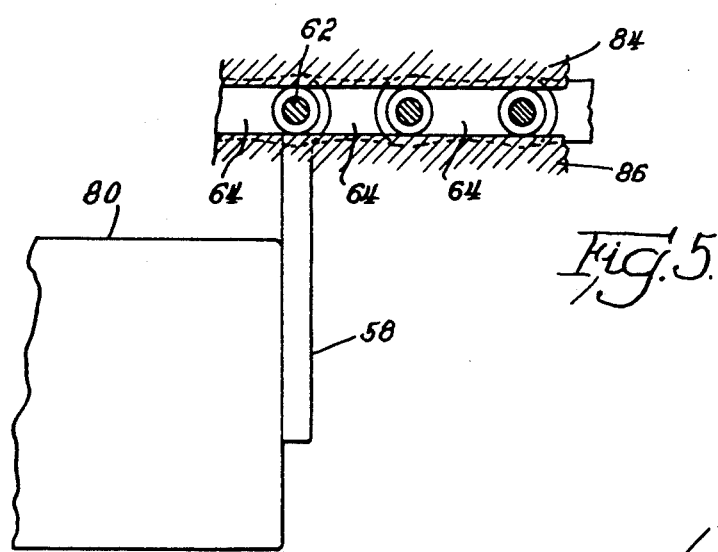
FIG. 5 is an enlarged side elevational view of a portion of a conveying chain, showing the chain captured between elongated guide rails.

A recirculating transfer mechanism according to the invention is shown generally at 10 in the drawing figures. The mechanism 10 comprises three basic components. The first two are a pair of spaced, substantially identical endless first and second conveying devices or belts 12 and 14. The third component is a third endless conveying device or belt 16 which is located at one side of the first and second belts 12 and 14, with the third belt 16 being substantially identical to the first and second belts 12 and 14. The third belt 16 is offset relative to the belts 12 and 14, for reasons that will become evident below. All three belts 12–16 are of identical length and configuration, and are driven in unison.

A series of conveying flights 18 are located between the first and second belts 12 and 14, each flight being connected to and travelling with the belts 12 and 14, as shown schematically in FIG. 1, and as shown in greater detail and explained further below in relation to FIGS. 2–5. In the preferred form of the invention, the belts 12–16 are conventional chains consisting of a series of pivotally interlocked links, and each of the flights 18 is connected to the belts 12 and 14 at the pivotal interconnection of adjacent chain links.

Each of the belts 12 and 14 passes over and is supported by a respective series of sprockets 20 and 22. Similarly, the third belt 16 passes over and is supported by a series of sprockets 24. At least one shaft 26 drivingly interconnects one sprocket 20 of the belt 12 with a sprocket 22 of the belt 14. Thus, driving of any one of the sprockets 20 or 22 causes the two belts 12 and 14 to be driven directly in unison.

The belts 12–16 are driven by a motor 28 mounted atop a framework assembly 30 within which the belts 12–16 are mounted. The motor 28 is connected through a gear box 32 to a main drive shaft 34. The drive shaft 34 passes through a support bearing 36 and is engaged in a toothed wheel 38. An endless toothed belt 40 passes over the wheel 38 and over an additional pair of identical toothed wheels 42 and 44. A take-up idler 46 provides tension on the belt 40 to assure no slippage between the belt 40 and its respective toothed wheels 38, 42 and 44.

The wheel 42 is mounted on a drive shaft 48 which passes through a bearing 50 in the framework assembly 30 and engages one of the sprockets 24 for the third belt 16. Thus, when the wheel 42 is driven, the sprocket 24 is also directly driven through the shaft 48. Similarly, the wheel 44 is mounted on a drive shaft 52 which passes through a bearing 54 mounted in the framework assembly 30 and engages one of the sprockets 22 of the second belt 14. Thus, rotation of the wheel 44 directly drives the sprocket 22 and therefore the second belt 14.

Therefore, the three belts 12–16 are driven in unison by the motor 28. The toothed belt 40 drives the toothed wheels 42 and 44 in unison. The wheel 42 directly drives the sprocket 24 via the shaft 48. The wheel 44 directly drives the sprocket 22 via the shaft 52. Since at least one shaft 26 interconnects opposite sprockets 20 and 22 which are of the same size, the three belts 12–16 are always driven perfectly in unison. As will become evident below, driving of the belts 12–16 in unison is important to assure that the flights 18 are properly driven.

As is evident from the drawing figures, and in particular FIGS. 3 and 4, the various shafts 26, 34, 48 and 52 pass through appropriate bearings for mounting of the shafts. While some bearings have been described above, it is evident that, as is conventional, the shafts need to be supported in appropriate bearings for rotation of the shafts. Various bearings are therefore illustrated, mounted in the framework assembly 30 or attachments thereto, and are not described in greater detail since all are conventional.

Each flight 18 comprises a crossbeam 56 to which a paddle or pusher element 58 is attached. The crossbeam 56 may actually be composed of a series of interconnected sections which do not rotate relative to one another, and the paddle 58 may take on other configurations, may be segmented, and can be replaced by other operative elements, as described below in greater detail in relation to the second embodiment of FIG. 6. A slide link 60 may form part of each crossbeam 56 to accommodate any slight change of spacing between the belts 12 and 14 throughout the path of travel of the flights 18.

The flights 18 are each pivotally connected to the respective belts 12 and 14 via a link pin 62 which interconnects adjacent links 64 of the belts 12 and 14, as best shown in FIG. 5. That connection is also shown very diagrammatically in FIG. 1. Thus, each of the flights 18 is free to pivot with the link pins 62 to which they are attached.

The recirculating transfer mechanism 10 is designed so that the flights 18 travel through their paths without rotating about the longitudinal axes of the crossbeams 56. The offset third belt 16 and linkage between the belt 16 and the various flights 18 causes this result to occur. Each of the crossbeams 56 includes an extension 66 which is secured to an alignment coupling 68 interconnecting the third belt 16 and the second belt 14. The alignment coupling 68 includes a vertical leg comprising a pair of leg sections 70 and 72. A threaded dowel 74 is secured in one of the leg sections 70 or 72, and engages a socket formed in the other of the leg sections. As best shown in FIG. 4, the dowel 74 is threaded into the leg section 72, and slidingly engages a socket 76 formed within the leg section 70. Obviously, the dowel 74 could equally be secured within the leg section 70 and engage a socket within the leg section 72. The dowel arrangement permits slight variances in the distances between the belts 14 and 16 to be accommodated without undesired wracking of the belts as they travel.

The alignment coupling 68 also includes a pivotal arm 78 connecting the upper leg section 70 to a link pin 62 of two interconnected links 64 of the belt 16. This connection is in exactly the same fashion that the crossbeams 56 are secured to the belts 12 and 14.

As best shown in FIG. 1, the three belts 12-16 are substantially identical in configuration and size. They are driven in unison by the motor 28, as described above. Since the alignment coupling 68 is rigidly (that is, non-rotationally) secured to the extension 66 and arm 78, as the belts 12-16 are driven in unison, the alignment coupling 68 always retains the flight 18 with the paddle 58 disposes vertically, no matter where in the path of travel of the belts 12 and 14 a flight may be located at any particular time. It is the offset of the third belt 16 relative to the first and second belts 12 and 14, in combination with the alignment coupling 68, which always retains the paddles 58 in this orientation. Thus, the paddles 58 always travel at the same linear velocity of the belts 12-16, and when engaging an object 80, such as a roll of papers towels or a roll of toilet paper, always transport the object 80 at a constant linear velocity without any undesired acceleration either initially when contacting the object 80 or when returning and disengaging from contact with the object 80.

The object 80 is typically introduced into the mechanism 10 via a conventional conveyor 81 and is transported by the mechanism 10 across a dead plate 82. Depending on the size of the object 80 to be transported and the frictional interference between the object 80 and the dead plate 82, the object 80 may tend to lift the chains of the belts 12 and 14 due to back force. To avoid this potential problem, each of the belts 12 and 14 is sandwiched between a guide comprising a pair of elongated, spaced rails 84 and 86. With the links 64 of the chains of the belts 12 and 14 captured between the rails 84 and 86, the paddles 58 are always retained in their vertical orientation best shown in FIG. 5.

The lower rails 86 extend beneath the sprockets 20 and 22, and therefore are longer than the upper rails 84. This is to assure that the belts 12 and 14 are supported throughout the longest distance possible in their horizontal dimensions.

The belts 12-16 may extend over relatively long horizontal distances. Additional rails 88 can be used to support the belts 12-16 where not captured between the rails 84 and 86. Other conventional means of support, such as intervening sprockets, can also be used.

As explained above, the assemblies of the belts 12-16 are mounted in a framework assembly 30. The framework assembly 30, in turn, is mounted on a series of posts 90 which extend from a base 92. Rotatable rods 94 extend upwardly from the posts 90 and are attached in blocks 96 attached to the framework assembly 30. The rods 94 are capped by pulleys 98 which are interconnected by a belt 100. A height adjustment wheel 102 is used to rotate the rods 94 via the belt 100, raising or lowering the framework assembly 30 as desired.

In the schematic representation of the invention shown in FIG. 1, only two flights 18 are illustrated, while in the more detailed elevations of the invention, particularly FIG. 2, several of the flights 18 are illustrated. In the view shown in FIG. 2, twelve flights 18 are shown or provided for due to spacing of the flights 18. Obviously, any number of flights 18 could be employed, depending on the size of the apparatus of the recirculating transfer mechanism 10 and the sizes of the objects 80 which are to be conveyed thereby.

It is important that the belts 12-16 be of the same length and configuration, so that the belts travel in unison to convey the flights 18. While a generally rectangular configuration has been shown in FIGS. 1 and 2, obviously the belts 12-16 could follow different paths and therefore be of different configurations, so long as all of the belts 12-16 follow the same paths and are of the same length and configuration.

Figure 6:
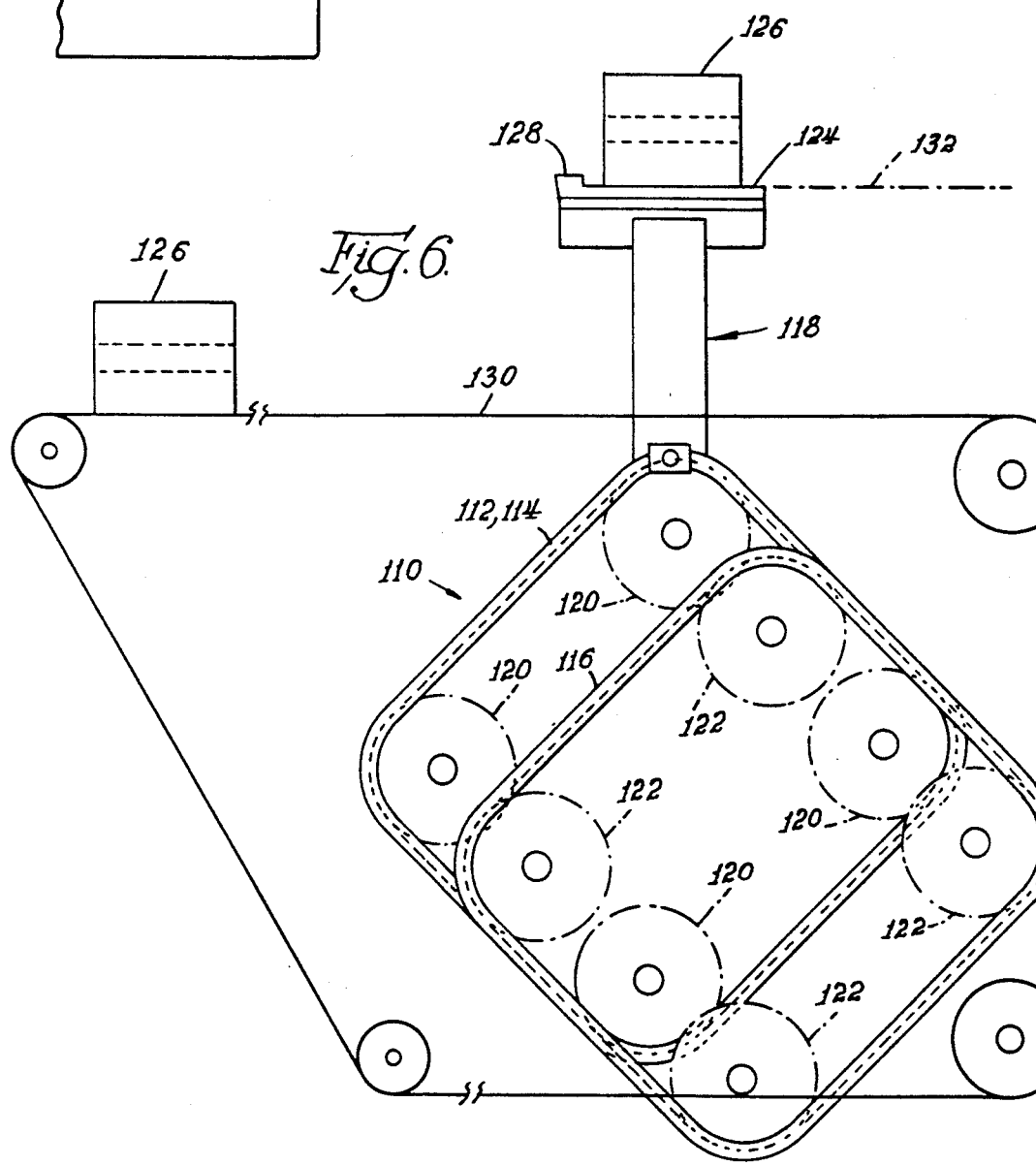
FIG. 6 is a side elevational view of a second form of the invention for elevating objects from one location to another.

A different configuration is shown in FIG. 6. In this form of the invention, a recirculating transfer mechanism 110 is used to elevate objects, rather than transport them horizontally. The recirculating transfer mechanism 110 is essentially identical to the recirculating transfer mechanism 10 of the previous embodiment of the invention, in that three belts are employed, constituting a pair of first and second belts 112 and 114 and an offset third belt 116. In the same fashion as the first form of the invention, one or more flights 118 are conveyed by the belts 112-116. The belts 112-116 are preferably chains, the belts 112, 114 passing over a series of sprockets 120, while the belt 116 passes over a series of sprockets 122. In the same fashion as the first form of the invention, all of the belts 112-116 are of the same length, are configured the same, and are driven in precise unison.

The flights 118, only one of which is shown, are connected to the first and second belts 112 and 114 in the same fashion that the flights 18 are secured to the belts 12 and 14 of the first form of the invention. Although not illustrated, an alignment coupling interconnects each of the flights 118 to the third belt 116 in the same fashion as illustrated in detail in FIGS. 1-5. Thus, the flights 118 are always retained in the orientation shown in FIG. 6 as the belts 112-116 traverse their respective paths.

Because the belts 112-116 are oriented at an angle to the vertical, the flight 118 traverses inclined paths for lifting of objects. Each of the flights 118 includes a horizontally-disposed support 124. As will become evident in a moment, the support 124 may comprise a platform, may comprise spaced support rails, or may be of any configuration appropriate to support an object 126 as it is elevated or lowered by the recirculating transfer mechanism 110. The support 124 includes a heel 128 to help retain the object 126 on the support 124.

The objects 126, which may be rolls such as paper towels or toilet paper, are introduced to the recirculating transfer mechanism 110 on a second conveyor 130 which traverses any desired path. The conveyor 130 may be segmented to accommodate penetration of the flights 118. The locations of the objects 126 on the conveyor 130 are synchronized with the recirculating paths of the flights 118 so that as the support 124 of a flight 118 is level with the conveyor 130, the flight 118 lifts the object 126 from the conveyor 130 and elevates the object 126 to the orientation shown in FIG. 6. At this orientation, the flight 118 begins its downward path of travel. However, the object 126, at the apex of travel of the flight 118, is deposited on a further surface 132. The surface 132 may be a dead plate, another conveyor, or any other device or mechanism capable of accepting the object 126. With appropriate formation of the flights 118, the form of the invention shown in FIG. 6 can therefore be used not only to elevate objects, but also stack objects by elevating one object and place it atop another conveyed by the conveyor 130. Many different uses for the recirculating transfer mechanism 110 are therefore possible.

With the third belt 16 or 116 offset from the respective belts 12, 14 or 112, 114, the recirculating transfer mechanism of the invention can be employed for a myriad of functions. As shown in FIGS. 1-5, the invention can be used to horizontally convey objects. As shown in FIG. 6, the invention can be used to elevate and/or elevate and stack objects. The uses of the invention are limited only by the potential needs of the user.

Various changes can be made to the invention without departing from the spirit thereof or scope of the following claims.

I claim:
1. A recirculating apparatus for transfer of objects from a first position to a second position, comprising
   a. a pair of spaced, substantially identical endless first and second conveying devices,
   b. means for driving said first and second conveying devices in unison,
   c. a plurality of spaced conveying flights located between said first and second conveying devices, said flights being connected to and travelling with said conveying devices,
   d. a third endless conveying device being located at one side of one of said first and second conveying devices, said third conveying device being substantially identical to said first and second conveying devices, and said third conveying device being offset relative to said one conveying device,
   e. means for driving said third conveying device in unison with said first and second conveying devices, and
   f. an alignment coupling interconnecting said third conveying device and each said flight, said coupling having a leg extending between said third conveying device and said flight, said leg being rigidly connected to said flight to prevent rotation of said flight relative to said leg.

2. An apparatus according to claim 1 in which each conveying device comprises an endless chain having a series of pivotally connected links.

3. An apparatus according to claim 2 in which each said flight includes a crossbeam extending between said first and second conveying devices, said crossbeam being pivotally connected to each of said first and second conveying devices at a pivotal link connection.

4. An apparatus according to claim 3 in which said pivotal link connection comprises a link pin connecting adjacent links of said chain.

5. An apparatus according to claim 2 in which said chains pass over sprocket wheels, and in which said means for driving said first and second conveying devices in unison comprises a shaft drivingly connecting a sprocket wheel of said first conveying device with a sprocket wheel of said second conveying device, and including a motor associated with said conveying devices for rotating said shaft.

6. An apparatus according to claim 5 in which said means for driving said third conveying device comprises means drivingly coupling said motor to a sprocket wheel of said third conveying device.

7. An apparatus according to claim 1 in which each said flight includes a crossbeam extending between said first and second conveying devices, said crossbeam being pivotally connected to each of said first and second conveying devices at a pivotal link connection.

8. An apparatus according to claim 1 including a pivotal arm connecting said leg to said third conveying device, said arm being secured to said leg.

9. An apparatus according to claim 8 in which said third conveying device comprises an endless chain having a series of pivotally connected links, said arm being connected to said links at a pivotal link connection.

10. An apparatus according to claim in which said leg comprises a pair of leg sections, and including means slidingly interconnecting said leg sections.

11. An apparatus according to claim 10 in which said means slidingly interconnecting comprises a shaft extending from one of said leg sections and engaging a socket formed in the other of said leg sections.

12. An apparatus according to claim 1 in which said first and second conveying devices comprise endless chains, and including means guiding portions of said chains.

13. An apparatus according to claim 12 in which said guiding means comprises for each chain at least one pair of elongated, spaced rails located to sandwich said chain therebetween.

14. An apparatus according to claim 1 in which each said conveying device comprises an endless chain of generally rectangular configuration.

15. An apparatus according to claim 14 in which said chains are oriented with sides being disposed at an angle to vertical such that each flight includes at least one inclined path traversed by said flight.

16. An apparatus according to claim 15 in which each flight includes horizontally-disposed means for carrying objects.

17. A recirculating apparatus for transfer of objects from a first position to a second position, comprising
   a. a pair of spaced, substantially identical endless first and second conveying devices of generally rectangular configuration,
   b. means for driving said first and second conveying devices in unison,
   c. at least one conveying flight located between said first and second conveying devices, said flight being connected to and travelling with said conveying devices,
   d. a third endless conveying device being located at one side of one of said first and second conveying devices, said third conveying device being substantially identical to said first and second conveying devices, and said third conveying device being offset relative to said one conveying device, e. means for driving said third conveying device in unison with said first and second conveying devices, f. an alignment coupling interconnecting said third conveying device and said flight, said coupling having a leg extending between said third conveying device and said flight, said leg being rigidly connected to said flight to prevent rotation of said flight relative to said leg, and g. said conveying devices being oriented with sides disposed at an angle to vertical such that each flight includes at least one inclined path traversed by said flight.

18. An apparatus according to claim 17 in which each flight includes horizontally-disposed means for carrying objects.

19. A recirculating apparatus for transfer of objects from a first position to a second position, comprising a. a pair of spaced, substantially identical endless first and second conveying devices, each conveying device comprising an endless chain having a series of pivotally connected links, b. means for driving said first and second conveying devices in unison, c. at least one conveying flight located between said first and second conveying devices, said flight being connected to and travelling with said conveying devices, d. a third endless conveying device being located at one side of one of said first and second conveying devices, said third conveying device being substantially identical to said first and second conveying devices, and said third conveying device being offset relative to said one conveying device, e. means for driving said third conveying device in unison with said first and second conveying devices, f. an alignment coupling interconnecting said third conveying device and said flight, said coupling having a leg extending between said third conveying device and said flight, said leg being rigidly connected to said flight to prevent rotation of said flight relative to said leg, and g. said chains passing over sprocket wheels, and said means for driving said first and second conveying devices in unison comprising a shaft drivingly connecting a sprocket wheel of said first conveying device with a sprocket wheel of said second conveying device, and including a motor associated with said conveying devices for rotating said shaft.

20. An apparatus according to claim 19 in which said means for driving said third conveying device comprises means drivingly coupling said motor to a sprocket wheel of said third conveying device.

21. A recirculating apparatus for transfer of objects from a first position to a second position, comprising a. a pair of spaced, substantially identical endless first and second conveying devices, b. means for driving said first and second conveying devices in unison, c. at least one conveying flight located between said first and second conveying devices, said flight being connected to and travelling with said conveying devices, d. a third endless conveying device being located at one side of one of said first and second conveying devices, said third conveying device being substantially identical to said first and second conveying devices, and said third conveying device being offset relative to said one conveying device, e. means for driving said third conveying device in unison with said first and second conveying devices, and f. an alignment coupling interconnecting said third conveying device and each said flight, said coupling having a leg extending between said third conveying device and said flight, said leg being rigidly connected to said flight to prevent rotation of said flight relative to said leg, and said leg comprising a pair of leg sections, with means slidingly interconnecting said leg sections.

* * * * *